Sept. 6, 1955     C. W. EARP     2,717,379
RADIO NAVIGATION

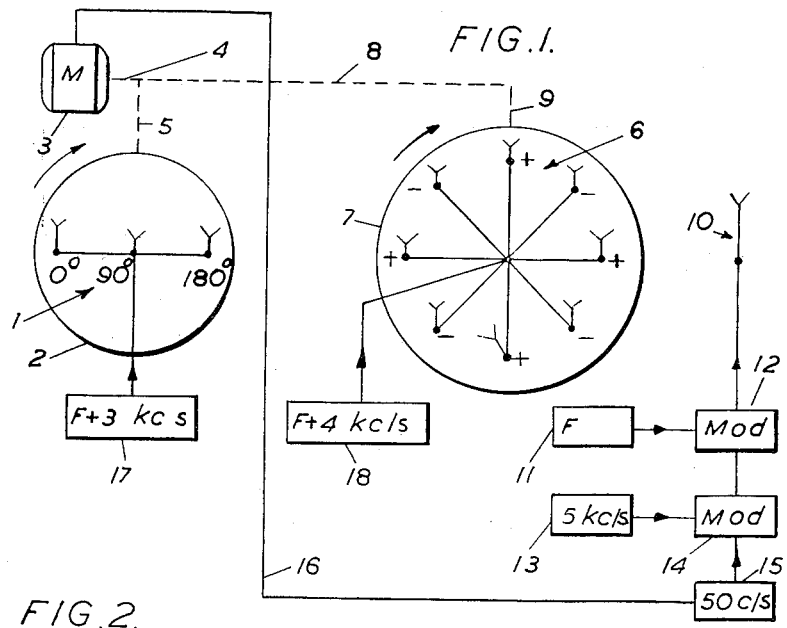

Filed Sept. 25, 1952     3 Sheets-Sheet 2

*Inventor*
C. W. EARP
By *Philip M. Bolton*
*Attorney*

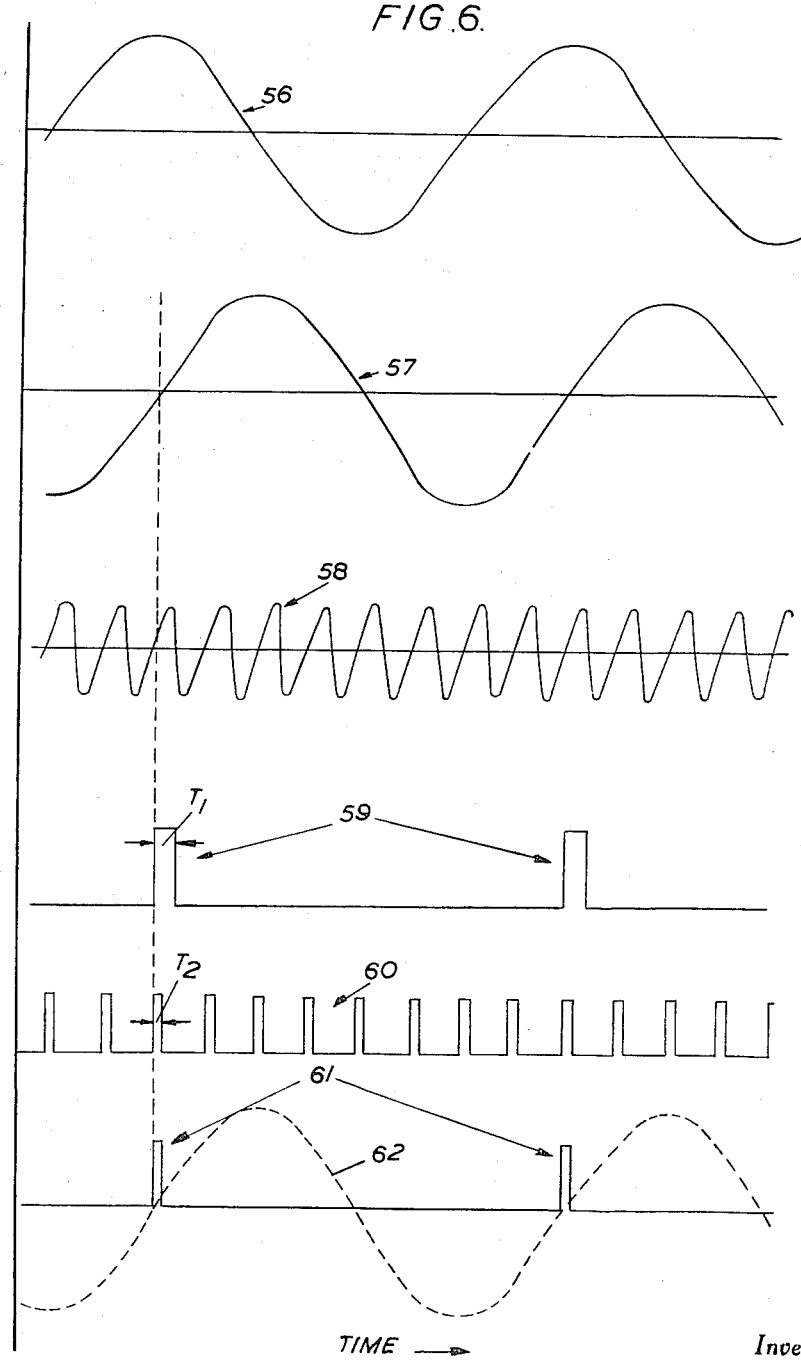

United States Patent Office 2,717,379
Patented Sept. 6, 1955

2,717,379

RADIO NAVIGATION

Charles William Earp, London, England, assignor to International Standard Electric Corporation, New York, N. Y., a corporation of Delaware Application September 25, 1952, Serial No. 311,435

Claims priority, application Great Britain October 29, 1951

11 Claims. (Cl. 343—106)

This invention relates to radio navigation systems of the type in which an indication is obtained at a receiving station of its direction with respect to a transmitting station. More particularly, it relates to systems of the aforesaid type in which the directional indication is obtained by comparison between a reference signal and a signal derived from "antenna-modulation" of the received energy i. e. from the modulation imposed on the received energy by virtue of its being transmitted or received via an antenna system having a continuously rotating directive radiation pattern. By "pattern" is to be understood, through the present specification, the polar diagram representing the relative efficiency of an antenna system in various directions in azimuth, this pattern being the same both for transmission and reception.

Radio navigation systems of the type mentioned are already known in which an unambiguous directional indication is obtained by phase comparison between the wave derived at a receiver by recovering the wave of antenna modulation and comparing it with a reference wave which is held in synchronism with the rotation of the antenna directive pattern, the latter being in the form of a cardioid. In the case of a beacon station, the rotating pattern is produced by the beacon antenna arrangement, while in a direction finding station the rotating pattern is produced by the receiving antenna arrangement. In general, the accuracy of directional indication given by such systems is not great. By changing the shape of the pattern from the single lobe or cardioid shape to a multi-lobe shape, such as figure-of-eight, the accuracy of the indication may be much improved, but at the expense of introducing ambiguity in the interpretation of the indication. The ambiguity difficulty may be overcome by using two patterns, one of which is a cardioid or single lobe pattern giving an indication of relatively poor accuracy but devoid of ambiguity, the other being a multilobed pattern giving relatively high accuracy but accompanied by as many ambiguities as there are lobes. If in such an arrangement the directional information is displayed on two instruments, one for each pattern, the operator can resolve the ambiguity by a mental process. In the case of the well known Adcock type of direction-finder, the same indicator is used to display alternately an indication of relatively high accuracy but with 180° ambiguity, and a "sense" indication without ambiguity but of relatively low accuracy, these indications being obtained respectively from a figure of eight pattern and the cardiod pattern resulting from cutting in to service the "sense antenna."

Another known example of the use of two patterns is a radio beacon in which the rotation of a directive radiation pattern of cardioid shape, capable of giving an approximate bearing without ambiguity, has been associated with the rotation of a pattern having more than two lobes and capable of indicating a bearing with high precision but with multiple ambiguities. Corresponding to each pattern there is an omnidirectional radiation which bears a fixed reference signal at the same frequency as the modulation resulting from rotation of the pattern. Phase comparison between the appropriate reference signal and the pattern modulation yields an approximate bearing, corresponding to the cardioid pattern, on one meter, and a more precise bearing corresponding to the multi-lobe pattern, on a second meter, the phase difference measured by this second meter rotating through a number of complete cycles for one complete cycle of azimuth variation.

It is a principal object of the present invention to provide a radio navigation system, using a multi-lobe rotating pattern, in which a high-precision directional indication is displayed automatically and unambiguously on a single instrument.

According to the most general aspect of the invention there is provided a radio navigation system comprising means at a receiver for deriving respective trains of pulses from two synchronously rotating radiation patterns having a single lobe and a plurality of lobes respectively, means for relatively adjusting the phases of the two trains so that single pulses of one train overlap corresponding single pulses of the other train, and means for applying only the resultant coincidental pulses for phase comparison with a reference wave held in synchronism with the rotation of said patterns.

According to a more detailed aspect of the invention there is provided a radio navigation system of the type in which an indication is obtained at a receiving station of its direction with respect to a transmtting station, said receiving station comprising an antenna means coupled to a receiving arrangement, said transmitting station including an antenna means coupled to a transmitting arrangement, one and only one of said antenna means being arranged to produce two directive patterns rotating synchronously at a given frequency $f-$, said patterns having respectively a single directive lobe and a plurality of N directive lobes, said receiving arrangement comprising means for recovering from the received energy the two modulation waves of respective frequencies $f-$ and $Nf-$ imposed thereon by said pattern rotation, means for converting said recovered waves into respective trains of pulses of repetition frequencies $f-$ and $Nf-$, the durations of the pulses of said trains being respectively large and small fractions of the period $1/Nf-$, means for adjusting the timing of the first-mentioned pulses to overlap every Nth pulse of the other train and thus to select every Nth pulse thereof, and means for comparing said selected pulses with a reference signal synchronised with said pattern rotation, the result of said comparison giving an unambiguous indication of the desired direction.

The invention will be more readily appreciated from the following descriptions of two specific embodiments, reference being made to the accompanying drawings, in which:

Fig. 1 illustrates a beacon station incorporating the principles of the invention;

Fig. 2 illustrates a receiving station for cooperative association with the beacon station of Fig. 1;

Fig. 6 illustrates certain waveforms referred to in the explanation of the operation of the stations illustrated in Figs. 1, 2 and 3.

Figure 3:
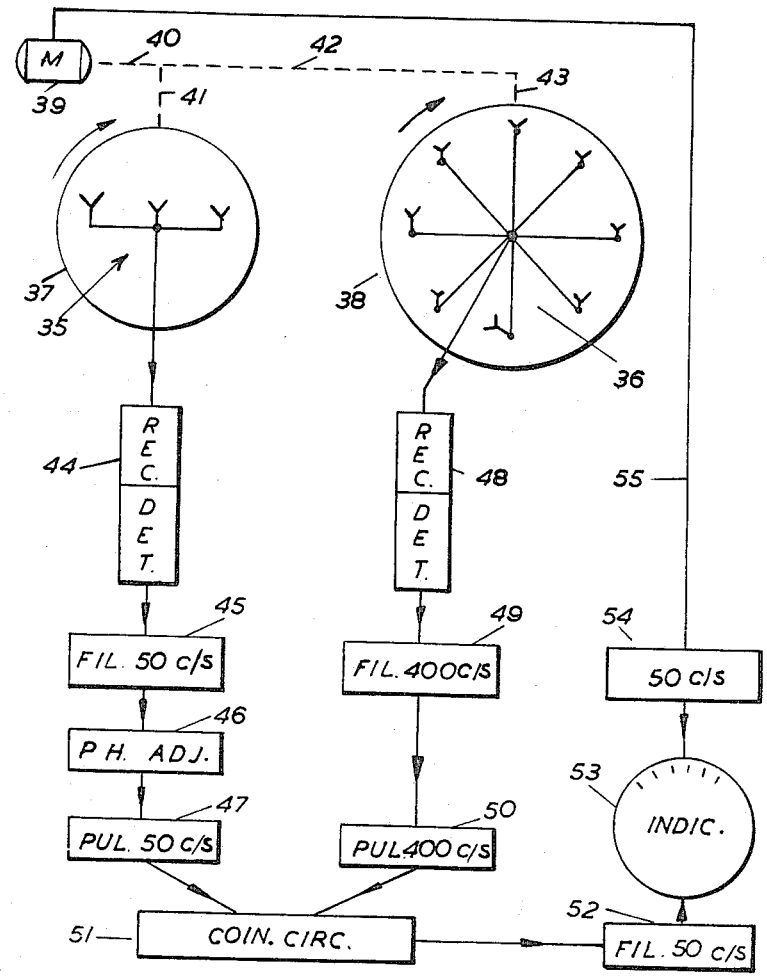
Fig. 3 illustrates a direction-finding station incorporating the principles of the invention.

Referring to Fig. 1, the beacon station illustrated therein comprises a linear three-element antenna array, indicated at 1, mounted on a turntable 2 arranged for rotation at a frequency of 50 C./S. by means of motor 3 to which the turntable is mechanically coupled as indicated by the dotted lines 4, 5. The beacon station also comprises a circular eight-element antenna array, indicated at 6, mounted on a turntable 7 arranged for rotation by means of motor 3, to which it is mechanically coupled as indicated by the dotted lines 4, 8, 9, synchronously with turntable 2. In addition, there is provided a fixed omnidirectional antenna indicated at 10. This fixed antenna 10 is energised from a source 11, of frequency F, the energy fed to the antenna 10 being amplitude modulated in modulator 12 by 5 Kc./S. energy which is derived from source 13 and is itself amplitude modulated in modulator 14 by a 50 C./S. reference wave drawn from source 15, the output from source 15 being synchronised with the 50 C./S. rotation of the turntables as symbolised by the full line 16.

Figure 4:
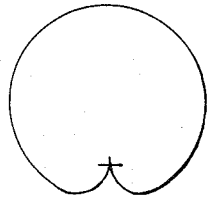
Figs. 4 and 5 illustrate antenna directive radiation patterns as used in the stations illustrated in Figs. 1 and 3.

The three-element linear array 1 is fed with unmodulated carrier energy, of frequency (F+3 Kc./S.), derived from carrier source 17. The three antennae of the array are fed with relative carrier phases of 0°, 90°, 180°, as indicated on the drawing, and are so spaced that the resultant radiation pattern is of cardioid shape, as illustrated in Fig. 4, having only one directive lobe. Arrays of this type are well known, and it is therefore unnecessary to describe the array in further detail.

Figure 5:
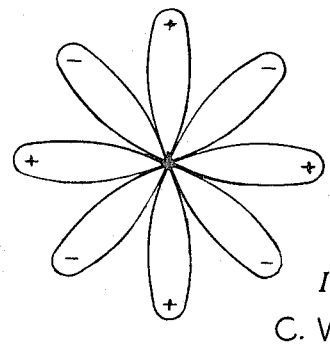

The circular eight-element array 6 is energised with unmodulated carrier energy, of frequency (F+4 Kc./S.) derived from carrier source 18. Alternate ones of the antennae are fed co-phasally, as indicated by the plus sign on the drawing, the intervening antennae being fed in reversed phase, as indicated by the minus sign on the drawing. The antennae are uniformly spaced round the circle, the radius of which is made such that the direction radiation pattern set up by the circular array is a "daisy pattern," as illustrated in Fig. 5, having eight equally spaced directive lobes, the phases of any two adjacent lobes being in opposition as indicated by the plus and minus signs. Such circular arrays are already well known, and it is therefore unnecessary to describe the array in further detail.

It will be appreciated that at a distant point the beacon station will set up three fields all of which are modulated. The field from omnidirectional antenna 10 of carrier frequency F, is amplitude modulated at 5 Kc./S. by a wave which is itself frequency modulated at 50 C./S., the phase of this 50 C./S. modulation corresponding to the phase of rotation of the arrays 1 and 6. The field from array 1, of carrier frequency (F+3 Kc./S.), is amplitude modulated at 50 C./S. due to the rotation of the cardioid (i. e. single-lobe) pattern at 50 C./S. The field from array 6, of carrier frequency (F+4 Kc./S.), is amplitude modulated at 400 C./S. due to the rotation of the eight-lobe pattern at 50 C./S.

It will be appreciated that by the use of different carrier frequencies for the patterns, and the transmission of the reference signal as a modulation of a sub-carrier wave of 5 Kc./S., the risk of intermodulation in the associated receiving station giving rise to unwanted phase shifts of the direction-yielding waves is much reduced.

Turning now to Fig. 2, this illustrates a receiving station arranged to respond to the beacon station illustrated in Fig. 1. In this receiving station the energies radiated by the beacon antenna systems are all picked up by antenna 18 and detected, after any desired amplification, in receiver-detector 19. The output of receiver-detector 19 includes three components corresponding each to a respective one of the three fields set up by the beacon. One of these components arises from beats between the energy radiated at frequency F by the omnidirectional antenna and the energy radiated at frequency (F+3 Kc./S.) by the rotating cardioid-pattern array, and is a wave of frequency 3 Kc./S. modulated at 50 C./S. by the rotation of the pattern. This 3 Kc./S. component is selected by a bandpass filter 20, of centre frequency 3 Kc./S. The output of filter 20 is applied to an amplitude detector 21, which yields the 50 cycle modulation wave corresponding to the rotation of the single-lobe cardioid pattern. Output from detector 21 is fed through a 50 C./S. filter 22 to a phase adjusting device 23, the function of which will be explained hereinafter, and is then applied to a pulse producing unit indicated at 24, in which the 50 C./S. wave is squared and differentiated in accordance with well known pulse technique to yield a train of pulses of like polarity and of 50 C./S. repetition frequency, and of duration period T₁ of the order of 1000 microseconds, the timing of this train being controllable by phase adjusting device 23.

Another component of the output from receiver detector 19 arises from beats between the energy radiated at frequency F by the omnidirectional antenna and the energy radiated at frequency (F+4 Kc./S.) by the rotating eight-lobed-pattern array, and is a wave of frequency 4 Kc./S. modulated at 400 C./S. by the rotation of the pattern. This 4 Kc./S. component is selected by 4 Kc./S. bandpass filter 25, and applied to amplitude detector 26, the 400 C./S. modulation wave in the output of detector 26 being passed through a 400 C./S. filter 27 to a pulse-producing unit indicated at 28 for conversion by squaring and differentiation into a train of pulses of like polarity and of 400 C./S. repetition frequency and of duration period of the order of 100 microseconds.

The outputs from the pulse-producing units 24 and 28 are now applied to a "coincidence circuit" 29, which comprises a gating device of suitable known type which releases outputs only when a pulse from unit 24 and a pulse from unit 28 are applied thereto in overlapping time relationship. Adjustment of phase-adjusting unit 23 permits accurate gating every eighth 100 microsecond pulses from pulse-producer 28 by a broader 1000 microsecond pulse from pulse-producer 24. The output from the coincidence circuit thus takes the form of a train of pulses, of repetition frequency 400/8 i. e. 50 C. P. S., and of pulse duration period 100 microseconds, the timing of this train being determined by the eight-lobe pattern, and thus being unambiguously representative of the direction of propagation of the received signals a much greater degree of accuracy than that of the (also unambiguous) 50 C./S. pulses derived from the cardioid pattern via units 20, 21, 22, 23, 24. The 50 C./S. pulse train obtained from the coincidence circuit 29 is then applied to a low pass 50 C./S. filter for conversion to a 50 C./S. sinusoidal "comparison" wave.

Still another component of the output from receiver-detector 19 is the modulation envelope of the energy radiated from the beacon omnidirectional antenna. This modulation envelope is a wave of frequency 5 Kc./S. frequency modulated by the 50 C./S. reference wave in synchronism with the rotation of the beacon arrays. The 5 Kc./S. component is selected by 5 Kc./S. bandpass filter 31, and then applied to a discriminator unit 32 which extracts the frequency modulation of the 5 Kc./S. wave to yield a 50 C./S. reference wave which is selected by means of 50 C./S. filter 33.

The direction indication is finally unambiguously obtained by phase comparison, on a single indicator 34, between the 50 C./S. reference wave output from filter 33 and the "comparison" 50 C./S. wave obtained at the output of low pass filter. Indicator 34 is constituted by a 360° phase-meter of any convenient type, such as a dynameter instrument or a cathode ray phase measuring equipment.

Fig. 3 shows a direction finding station which embodies the invention. The station comprises two antenna arrays 35 and 36 mounted on respective turntables 37 and 38 for synchronous rotation in the same direction by motor 39 at a rate of 50 C./S. through couplings indicated by the dotted lines 40, 41, and 40, 42, 43. Antenna array 35 is similar to the three-element linear array 1 of Fig. 1, and is arranged to give a single lobe cardioid pattern such as illustrated in Fig. 4. Antenna array 36 is similar to the eight element circular array 6 of Fig. 1, and as arranged to give an eight-lobed pattern such as illustrated in Fig. 5. The energy picked up from a distant transmitter by the three-element rotating array 35 is modulated at 50 C./S. by virtue of the rotation of the cardioid pattern at that speed, this energy is fed to a receiver-detector 44. From the output of receiver-detector 44 the 50 C./S. modulation wave is selected in 50 C./S. bandpass filter 45, phased in phase adjuster 46, and converted to a train of pulses of 1000 microseconds duration-period by means of pulse-producing unit 47. Filter 45, phase adjuster 46, and pulse-producer 47 are respectively similar to units 22, 23 and 24 of Fig. 2. The energy picked up by the eight-element circular array is modulated at 400 C./S. by virtue of the rotation of the eight-lobed pattern at 50 C./S.; this energy is fed to receiver-detector 48. From the output of receiver-detector 48 the 400 C./S. modulation wave is selected in 400 C./S. bandpass filter 49, and converted to a train of pulses of 100 microseconds duration-period by means of pulse-producing unit 50. Filter 49 and pulse-producer 50 are respectively similar to units 27 and 28 of Fig. 2.

The outputs from pulse-producers 47 and 50 are now applied to a coincidence circuit 51, similar to the coincidence circuit 29 of Fig. 2, and with suitable adjustment of phase adjuster 46 there is obtained from coincidence circuit 51 a train of pulses of 50 C./S. repetition frequency and 100 microseconds pulse duration period corresponding to every eighth pulse of the 400 C./S. train derived from pulse producer 50, the timing of this train being determined by the eight-lobe pattern of rotating array 38, and being unambiguously representative of the direction of propagation of the received signals. The output of coincidence circuit 51 is applied to 50 C. P. S. low pass filter 52 (similar to filter 30 in Fig. 2) for conversion to a 50 C./S. "comparison" sine wave, and the bearing of the received signal is then unambiguously indicated on indicator 53 (similar to indicator 34 of Fig. 2), which compares the phase of the 50 C./S. "comparison" wave from filter 52 with that of a reference wave supplied by a 50 C./S. source 54 which is maintained in synchronism with the antenna rotation of the arrays by coupling means symbolised by the line 55.

It will of course be understood that in both embodiments the phase relationships between the comparison and reference waves will be subject to an error determined by the fixed phase-shifts in the various units other than the phase adjustor specifically mentioned. This error may be compensated in any convenient manner, for example by altering the zero on the indicator or by imposing additional phase shift on either of the two waves to bring the fixed relative shift up to an integral number of cycles at the wave frequency.

The operation of both the described embodiments of the invention will now be reviewed with reference to the wave-forms illustrated in Fig. 6. These wave forms are all drawn to the same time scale, but no regard has been had to the fixed phase changes inherent in the various apparatus units.

Taking first the beacon system described with reference to Figs. 1 and 2, curve 56 of Fig. 6 illustrates the 50 C./S. reference wave supplied by source 15, Fig. 1, synchronous with the rotation of the beacon arrays 1 and 6, and recovered in the receiving station Fig. 2 to become available at the output of filter 33 for application to the indicator 34.

Curve 57 of Fig. 6 illustrates the 50 C./S. wave obtained in the receiving station Fig. 2 at the output of filter 22. As already mentioned, this wave corresponds to the modulation of the field set up by the rotation of the cardioid pattern of the beacon, and its phase relative to the reference wave is determined by the direction of propagation.

Curve 58 of Fig. 6 illustrates the 400 C./S. wave obtained in the receiving station Fig. 2 at the output of filter 27. As already mentioned, this wave corresponds to the modulation of the field set up by the rotation of the eight-lobed pattern of the array, and its phase is (ambiguously) dependent on the direction of propagation.

Curve 59 of Fig. 6 shows two pulses of the 50 C./S. train of pulses obtained in the receiving station Fig. 2 at the output of pulse-producing unit 24. The timing of these pulses is primarily determined by the phasing of the originating wave 57 (the pulses occurring at the instants when wave 57 passes through its zero value in a given direction), but may be slightly modified for the purpose hereinafter described by means of phase adjuster 23 (Fig. 2). The duration period $T_1$ of these pulses is not critical but should be made a large fraction of the period of the 400 C./S. wave 58; in the present example $T_1$ has been made 1000 microseconds, equal to 0.4 of the period of the 400 C./S. wave.

Curve 60 of Fig. 6 illustrates the train of pulses obtained in the receiving station Fig. 2 at the output of pulse-producing unit 28. The timing of these pulses is determined by the phasing of the originating 400 C./S. wave 58. The durtion period $T_2$ of these pulses is made a small fraction of the period of the 400 C./S. wave 58; in the present instance $T_2$ has been made 100 microseconds, equal to 0.04 of the period of the 400 C./S. wave.

Curve 61 of Fig. 6 shows two pulses of the 50 C./S. train of pulses obtained in the receiving station Fig. 2 at the output of the pulse-coincidence circuit 29, while curve 62 of Fig. 6 illustrates the 50 C./S. sinusoidal comparison wave obtained from pulse train 61 by means of the low pass filter. The phasing of comparison wave 62 is determined by the timing of pulse train 61 i. e. by the timing of those pulses of train 60 which are passed through the coincidence circuit by virtue of their being overlapped in time by the pulses of train 59. The directional indication is obtained by phase comparison in indicator 34 (Fig. 2) between the reference wave 56 and the comparison wave 62 i. e. between the reference wave and a wave derived from the rotating eight-lobed pattern.

Consideration of the curves of Fig. 6 will make it evident that the duration period $T_1$ of the pulses of train 59 must be such as not to overlap the whole or parts of two consecutive pulses of train 60, but should be at least equal to the duration period of the pulses of train 60, so that the latter may be fully overlapped. This leaves the possibility that in certain circumstances the pulses of train 59 might not overlap any of the pulses of train 60, in which case no comparison wave should be produced. It is in order to overcome this difficulty that the phase adjuster 23 (Fig. 2) is provided; by suitable operation of this phase adjuster the pulses of train 59 may be brought fully into the required overlapping relation with the pulses of train 60. It will be clear that the range of phase adjustment required will be relatively small, being merely that corresponding to the time interval between the pulses of the 400 C./S. train 60 i. e. to 2500 microseconds (45° phase-shift in a 50 C./S. wave) in the case of the described embodiment. It should be noted that this phase adjustment does not affect the directional indication other than by ensuring that the comparison wave is not reduced in intensity by failure of the coincidence circuit to pass the selected pulses for the whole of their duration periods. If the direction being measured is changed, then the two trains indicated by 59 and 60 move along the time scale together with little relative shift, and no re-adjustment of the phase adjuster should be necessary.

Turning now to the direction-finding station described with reference to Fig. 3, the curves of Fig. 6 apply as follows. Curve 56 of Fig. 6 is again the 50 C./S. reference wave, this time derived from source 54 in Fig. 3. Curve 57 is the 50 C./S. wave resulting from rotation of the cardioid pattern of array 35 and appearing at the output of filter 45 in Fig. 3, while curve 58 is the 400 C./S. wave resulting from rotation of the eight-lobed pattern of array 38 and appearing at the output of filter 49 in Fig. 3. The pulse trains illustrated by curves 59 and 60 of Fig. 6 are the trains delivered respectively by the pulse-producing units 47 and 50 of Fig. 2. Pulse train 61 is the 50 C./S. train delivered by the pulse coincidence circuit 51 of Fig. 2, curve 62 being the sinusoidal 50 C./S. comparison wave obtained at the output of filter 52 for phase comparison in indicator 53 (in Fig. 3) with the reference wave illustrated by curve 56 of Fig. 6. Subject to the foregoing re-definition of the sources of the waves illustrated in Fig. 6, all the remarks made as to the phasing and timing of the illustrated waves or pulse trains in connection with the beacon system illustrated in Figs. 1 and 2 apply in like manner to the direction-finding station illustrated in Fig. 3, and need not be repeated.

It will be appreciated that in the described systems the bearing signal is derived from only one of the lobes of the multi-lobe array i. e. the performance of the system has the same accuracy as if the rotating pattern took the form of a single unidirectional beam of the same shape as one of the lobes of the multi lobe pattern. The production of such a lobe by itself would however be difficult to attain without using antenna arrangements having much larger apertures than are necessary with the present invention, and the rotation of such a beam would present further considerable practical difficulty except in the case of systems working on centimeter wavelengths.

While the principles of the invention have been described above in connection with specific embodiments, it is to be clearly understood that this description is made only by way of example and not as a limitation on the scope of the invention. It will be obvious that the single lobe pattern is not necessarily restricted to cardioid shape, and that the multi-lobed daisy pattern is not necessarily restricted to eight lobes. Other antenna arrangements than those described may be utilised provided only that they are suitable for producing the required directive patterns, and mechanical rotation of the arrays may be replaced by the use of spatially fixed arrays the patterns of which are rotated electrically, for example by feeding the antennae through rotating goniometers. It will also be clear that the sine wave reference signal may be replaced by a train of sharp pulses of repetition frequency equal to the frequency of rotation of the directive pattern, the unambiguous directive indication then being obtained by timing comparison between the reference pulses and the pulses delivered by the pulse coincidence circuit.

What I claim is:

1. A radio navigation system comprising means at a receiver for deriving respective trains of pulses from two synchronously rotating radiation patterns having a single lobe and a plurality of lobes respectively, means for relatively adjusting the phases of the two trains so that single pulses of one train overlap corresponding single pulses of the other train, and means for applying only the resultant coincidental pulses for phase comparison with a reference wave held in synchronism with the rotation of said patterns.

2. A radio navigation system of the type in which an indication is obtained at a receiving station of its direction with respect to a transmitting action, said receiving station comprising an antenna means coupled to a receiving arrangement, said transmitting station including an antenna means coupled to a transmitting arrangement, one and only one of said antenna means being arranged to produce two directive patterns rotating synchronously at a given frequency $f-$, said patterns having respectively a single directive lobe and a plurality of N directive lobes, said receiving arrangement comprising means for recovering from the received energy the two modulation waves of respective frequencies $f-$ and $Nf-$ imposed thereon by said pattern rotation, means for converting said recovered waves into respective trains of pulses of repetition frequencies $f-$ and $Nf-$, the durations of the pulses of said trains being respectively large and small fractions of the period $1/Nf-$ means for adjusting the timing of the first-mentioned pulses to overlap every Nth pulse of the other train and thus to select every Nth pulse thereof, and means for comparing said selected pulses with a reference signal synchronised with said pattern rotation, the result of said comparison giving an unambiguous indication of the desired direction.

3. A radio navigation system comprising a beacon station including an antenna means coupled to a transmitting arangement, said antenna means being arranged to produce two directive patterns rotating synchronously at a given frequency $f-$, said patterns having respectively a single directive lobe and a plurality of N directive lobes, said beacon station further comprising means for transmitting omnidirectionally a reference signal of frequency $f-$ synchronised with the rotation of said patterns.

4. A radio navigation system according to claim 3, in which said directive patterns are radiated on different carrier frequencies.

5. A radio navigation system according to claim 4, in which said means for transmitting said reference signal comprises means for radiating energy omnidirectionally on a third carrier of frequency different from the carrier frequency of either of said patterns, a source of subcarrier energy of frequency greater than $Nf-$, means for modulating said sub-carrier by said reference signal, and means for modulating said third carrier by the modulated sub-carrier.

6. A radio navigation system comprising a receiving station for co-operative association with a beacon station in accordance with claim 3, said receiving station comprisin means for receiving energy radiated by said beacon station, means for recovering from said received energy said reference signal of frequency $f-$ and the two modulation waves of respective frequencies $f-$ and $Nf-$ imposed on said received energy by the rotation of the beacon directive patterns, means for converting said recovered modulation waves into respective trains of pulses of repetition frequencies $f-$ and $Nf-$ the durations of the pulses of said trains being respectively large and small fractions of the period $1/Nf-$ means for adjusting the timing of the first mentioned pulses to overlap every Nth pulse of the other train and thus to select every Nth pulse thereof, and means for comparing said selected pulses with said reference signal the result of said comparison giving an unambiguous indication of the direction of the receiving station with respect to said beacon station.

7. A radio navigation system comprising a direction finding station including an antenna means coupled to a receiving arrangement, said antenna means being arranged to produce two directive patterns rotating synchronously at a given frequency $f-$, said patterns having respectively a single directive lobe and a plurality of N directive lobes, said receiving arrangement comprising means for producing a reference signal of frequency $f-$ synchronised with the rotation of said patterns, means for recovering from the received radio energy the two modulation waves of frequencies $f-$ and $Nf-$ imposed on said received energy by the rotation of said patterns, means for converting said recovered modulation waves into respective trains of pulses of repetition frequencies $f-$ and $Nf-$, the duration of the pulses of said trains being respectively a large and a small fraction of the period $1/Nf-$, means for adjusting the timing of the first mentioned pulses to overlap every Nth pulse of the other train and thus to select every Nth pulse thereof, and means for comparing said selected pulses with said reference signal, the result of said comparison giving unambiguous indication of the direction of propagation of the received radio energy.

8. A radio navigation system according to claim 7 in which said means for adjusting the timing of said first mentioned pulses comprises means for adjusting the phase of said recovered modulation wave of frequency $f-$ prior to its conversion to said train of pulses of repetition frequency $f-$.

9. A radio navigation system according to claim 8, in which said single lobe pattern is of substantially cardioidal shape.

10. A radio navigation system according to claim 7 and in which said synchronised reference signal is a wave of frequency $f-$, and in which said means for comparing said selected pulses with said reference signal comprises filter means for deriving a substantially sinusoidal comparison wave from said selected pulses, and means for comparing the phases of said reference and comparison waves, and indicating the result of said phase comparison.

11. A radio navigation system according to claim 7, in which said pattern having a plurality of N directive lobes is an eight-lobed pattern with the lobes substantially alike and uniformly spaced round 360° of azimuth.

References Cited in the file of this patent

UNITED STATES PATENTS

| | | |
|---|---|---|
| 2,279,466 | Johnske et al. | Apr. 14, 1942 |
| 2,297,395 | Erben | Sept. 29, 1942 |
| 2,564,703 | Litchford et al | Aug. 21, 1951 |
| 2,565,506 | Litchford | Aug. 28, 1951 |
| 2,572,041 | Litchford et al. | Oct. 23, 1951 |

FOREIGN PATENTS

| | | |
|---|---|---|
| 890,823 | France | Nov. 19, 1943 |